United States Patent
Karlsson

(10) Patent No.: US 8,483,777 B2
(45) Date of Patent: Jul. 9, 2013

(54) METHOD AND ARRANGEMENT IN A WIRELESS COMMUNICATION SYSTEM

(75) Inventor: Jonas Karlsson, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 237 days.

(21) Appl. No.: 12/768,907

(22) Filed: Apr. 28, 2010

(65) Prior Publication Data
US 2011/0269511 A1 Nov. 3, 2011

Related U.S. Application Data

(63) Continuation of application No. PCT/SE2010/050460, filed on Apr. 26, 2010.

(51) Int. Cl.
*H04W 88/08* (2009.01)
(52) U.S. Cl.
USPC .......................... 455/572; 370/330
(58) Field of Classification Search
USPC .................. 455/11.1, 572, 574; 370/330
See application file for complete search history.

(56) References Cited

U.S. PATENT DOCUMENTS 7,082,113 B1 * 7/2006 Matusevich ............... 370/330
2009/0247071 A1 * 10/2009 Xhafa et al. ............... 455/11.1

OTHER PUBLICATIONS

3GPP TSG-RAN WG3#65bis, R3-092787, "Discussion on Gradually Cell Switch off/on," Miyazaki, Japan, Oct. 12-15, 2009.
3GPP TSG Ran WG1 Meeting #60bis, R1-102284, "TP to TR 25.927 'Solutions for energy saving within UTRA Node B'" Beijing, China, Apr. 12-16, 2010.
3GPP TSG RAN WG1 Meeting #60bis, R1-102283, "Gradually Cell Switch Off & On Method for Energy Saving," Beijing, China, Apr. 12-16, 2010.

* cited by examiner

*Primary Examiner* — Ajit Patel
*Assistant Examiner* — Myron K Wyche
(74) *Attorney, Agent, or Firm* — Coats & Bennett, P.L.L.C.

(57) ABSTRACT

The present invention relates to a method and arrangements in a radio base station for turning off the output power for a frequency carrier of a cell. The radio base station is configured to use at least two different modulation schemes. Each of the modulation schemes requires a different output power spectrum density for the frequency carrier. The method in the radio base station comprises reducing (410) the available output power spectrum density for the frequency carrier gradually, and disabling (420) the modulation scheme with the highest required output power spectrum density, before the available output power spectrum density falls below said highest required output power spectrum density. It also comprises turning off (430) the output power for the frequency carrier before the available output power spectrum density falls below the highest required output power spectrum density of the at least one remaining non-disabled modulation scheme.

12 Claims, 6 Drawing Sheets

METHOD AND ARRANGEMENT IN A WIRELESS COMMUNICATION SYSTEM

RELATED APPLICATIONS

This application claims priority as a continuation of the International Patent Application identified by serial number PCT/SE2010/050460 and filed Apr. 26, 2010, the entire contents of which are incorporated herein by reference.

TECHNICAL FIELD

The present invention relates to a method and a radio base station in a wireless communication system. In particular it relates to turning off the output power for a frequency carrier of a cell.

BACKGROUND

GSM (Global System for Mobile Communications) is the most spread mobile telephone systems in the world. GSM differs from its predecessor technologies in that both signaling and speech channels are digital, and thus GSM is considered a second generation (2G) mobile phone system. The GSM standard also adds packet data capabilities by means of General Packet Radio Service (GPRS). GPRS is standardized by the 3rd Generation Partnership Project (3GPP).

Enhanced Data Rates for GSM Evolution (EDGE, also known as Enhanced GPRS) is a superset to GPRS and can function on any network with GPRS deployed on it, provided the carrier implements the necessary upgrades. EDGE provides higher speed data transmission. In addition to Gaussian minimum shift keying, EDGE uses 8 phase shift keying (8PSK) for the upper five of its nine modulation and coding schemes. EDGE produces a 3-bit word for every change in carrier phase. This effectively triples the gross data rate offered by GSM. EDGE is considered a third generation (3G) radio technology. Evolved EDGE is a further step in the evolution of the 3GPP standard providing reduced latency and more than doubled performance. Evolved EDGE improves on EDGE in a number of ways. Bit rates are e.g. increased up to 1 MBit/s peak bandwidth and latencies down to 800 ms using dual carriers, higher symbol rate and higher-order modulation, and turbo codes to improve error correction.

The Universal Mobile Telecommunication System (UMTS) is also one of the 3G mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS system and evolved UTRAN (e-UTRAN) is the radio access network of an LTE system. As illustrated in FIG. 1, a radio access network typically comprises user equipments (UE) 150 wirelessly connected to radio base stations (RBS) 110*a-c*, commonly referred to as NodeB (NB) in UTRAN and eNodeB (eNB) in e-UTRAN. The RBS serves one or more areas referred to as cells 120*a-c*. In FIG. 1 the UE 150 is served by the serving cell 120*a*. Cells 120*b* and 120*c* are neighboring cells.

When performing maintenance of a an RBS it is sometimes necessary to stop the operation of the whole cell of the RBS for a short time, i.e. to turn off the output power for the frequency carriers of the cell. When turning off the output power of a whole cell, all the UEs in the cell that are connected to the RBS will lose their connections and start searching for and connecting to alternative neighboring cells and RBSs. If for example maintenance in an RBS 110*a* requires that the output power of the frequency carrier of cell 120*a* is turned off, the UE 150 will suddenly loose connection to the RBS, and will then try to connect e.g. to RBS 110*b* and cell 120*b*. In e-UTRAN, the UEs do not drop their calls immediately when they loose connection. Instead they will be disconnected for some time and will not be able to communicate during that time. If the disconnection time is short, the user of the UE will probably not notice the disconnection. If the cell is turned off suddenly and if there are many active UEs in the cell, all these UEs will at the same time start to connect to alternative cells and eNBs, which may lead to congestion for the alternative eNBs random access control channels, and thus longer disconnection times for the UEs.

In UTRAN, a solution to the problem of dropped calls when the output power of a NB is suddenly turned off is to instead gradually reduce the output power of the NB pilot or reference signal before turning off the power completely. As a handover is based on a comparison of measurements of the pilot signal transmitted by the serving NB and neighboring NBs, a gradual reduction of the output power of the pilot signal for a serving NB, will trigger the UEs connected to this NB to make handovers to neighbor cells or NBs. The UEs close to cell borders and alternative NBs will be the first to perform handovers. The number of UEs still connected to the NB at the time when it is finally turned off may be reduced in this way, thus reducing the amount of dropped calls. If the output power of the pilot signal is very low before the power is turned off, then very few UEs will still be connected to the NB.

The radio units in a RBS of a radio access network such as the one illustrated in FIG. 1, are capable of fulfilling the standardized requirements on transmission signal quality such as the error vector magnitude (EVM), unwanted emission, and spurious emission within a certain specified output power range, which is specific for each product type. For example a 40 W radio unit might be certified to transmit signals within the range of 1-40 W, which means that the radio unit will have acceptable EVM and emission within this range. The EVM is a measure of the allowed error in the transmitted signal compared to the theoretically ideal signal.

The power spectrum density of a radio unit will together with the amount of scheduled resources indicate what the total output power is. It is important to make the distinction between total output power and output power spectrum density for a system which allows scheduling of resources over a limited part of the system bandwidth in a sub frame, such as in an e-UTRAN. In one sub frame all resources may be scheduled, in the next maybe only half of the resources are scheduled. The total output power may thus vary from sub frame to sub frame depending on the amount of scheduled resources, although the available output power spectrum density is the same for both sub frames. In GSM though, it is not possible to schedule resources only on a part of the available system bandwidth, so the total output power will not vary in the same way.

Even though the total output power range for a radio unit in e.g. an e-UTRAN might be large (e.g. 1-40 W as in the example mentioned above), a major part of the range is typically dedicated for scheduling and/or power control purposes, and a minor part is dedicated for the reference signal. The power range corresponding to the reference signal is thus not that large which thus limits the possibility to reduce the output power of the reference signal. Furthermore, the relation between the output power of the reference signal and the output power used for scheduled data should typically be the same when the total output power is lowered in e-UTRAN. In most cases it is thus not possible to reduce only the reference signal power, without reducing the output power for scheduled data.

As already mentioned above, different modulation schemes may be used in the different technologies. Some examples of modulation schemes are the phase shift keying (PSK) modulations such as quaternary or quadrature PSK (QPSK) and 8PSK. With four phases, QPSK can encode two bits per symbol. Other examples are the combinations of PSK and amplitude-shift keying (ASK) modulations—also called quadrature amplitude modulation (QAM)—of different orders such as 16QAM and 64QAM. The use of a higher order modulation scheme provides a higher bandwidth utilization (transmission of more bits per symbol), but at the same time it puts higher requirements on the radio unit. The EVM requirement e.g. is higher for a radio unit using a higher order modulation scheme than for a radio unit with a lower order modulation scheme. The total power range of a radio unit will thus be affected by the modulation scheme used, thereby also affecting the possibility to reduce the power of the reference signal.

Consequently, the reduction of the output power of the reference signal that may be done in order to force UEs to perform a handover is in practice limited, both by the fix relation between the output power of the reference signal and the output power used for scheduled data, and by the limited output power range in an RBS using a higher order modulation.

SUMMARY

The object of the present invention is to address some of the problems and disadvantages outlined above, and to allow turning off the output power for a frequency carrier of a cell with as little disturbance for active UEs as possible, also when higher order modulations are used. This object and others are achieved by the method and device according to the independent claims, and by the embodiments according to the dependent claims.

In accordance with a first aspect of the present invention, a method for a radio base station in a wireless communications system of turning off the output power for a frequency carrier of a cell is provided. The radio base station is configured to use at least two different modulation schemes, and each of the modulation schemes requires a different output power spectrum density for the frequency carrier. The method comprises reducing the available output power spectrum density for the frequency carrier gradually, and disabling the modulation scheme with the highest required output power spectrum density, before the available output power spectrum density falls below the highest required output power spectrum density. The method also comprises turning off the output power for the frequency carrier before the available output power spectrum density falls below the highest required output power spectrum density of the at least one remaining non-disabled modulation scheme.

In accordance with a second aspect of the present invention, a radio base station is provided. The radio base station is configured to be able to turn off the output power for a frequency carrier of a cell in a wireless communications system, and to use at least two different modulation schemes. Each of the modulation schemes requires a different output power spectrum density for the frequency carrier. The radio base station comprises a power reducing unit configured to reduce the available output power spectrum density for the frequency carrier gradually, and a disabling unit configured to disable the modulation scheme with the highest required output power spectrum density, before the available output power spectrum density falls below the highest required output power spectrum density. The radio base station also comprises a power off unit configured to turn off the output power for the frequency carrier before the available output power spectrum density falls below the highest required output power spectrum density of the at least one remaining non-disabled modulation scheme.

An advantage of embodiments of the present invention is that they allow for a higher user satisfaction since disconnections are rare and disconnection times are short when a cell is turned off e.g. due to maintenance.

Still another advantage of embodiments of the present invention is that congestion in the random access control channel may be avoided when a cell is turned off.

A further advantage of embodiments of the present invention is that they allow maintenance in radio base stations with minimal disturbance for the UEs that are active in that cell.

Another advantage of embodiments of the present invention is that they allow for lower call-drop rates when turning off a cell.

Other objects, advantages and novel features of the invention will become apparent from the following detailed description of the invention when considered in conjunction with the accompanying drawings.

DETAILED DESCRIPTION

Figure 1:
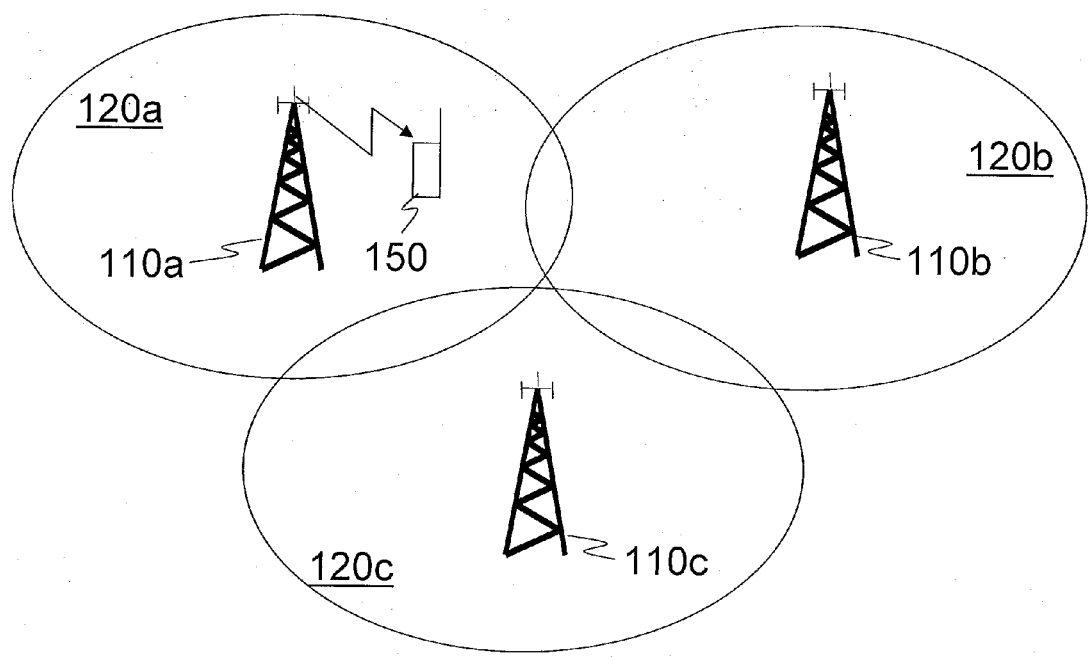
FIG. 1 illustrates schematically a conventional radio access network wherein the present invention may be implemented.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular embodiments of the invention are described in a non-limiting general context in relation to an e-UTRAN, and to an eNB that is configured to use three different modulation schemes (QPSK, 16QAM and 64QAM). It should though be noted that the invention and its exemplary embodiments may also be applied to other types of radio access networks such as GSM/EDGE, and to RBSs configured to use other types and combinations of modulation schemes.

As already stated above, the total power range of a radio unit will be affected by the modulation scheme used. Some examples of total power ranges of radio base stations (RBS) using different sets of modulation schemes are given in Table 1.

TABLE 1

Power ranges vs modulation schemes

| | |
|---|---|
| Maximum total power range when using QPSK, 16QAM and 64QAM | 10 W-40 W |
| Maximum total power range when using QPSK and 16QAM | 5 W-40 W |
| Maximum total power range when using QPSK | 1 W-40 W |

The lowest power level of the ranges indicated in Table 1, corresponds to the minimum required output power needed to generate a signal of acceptable quality when modulating the signal according to the corresponding modulation scheme of highest order. A signal modulated with 64QAM e.g. requires a total output power of 10 W in order to fulfill the EVM requirements.

Different modulation schemes such as QPSK, 16QAM, and 64QAM, which may be used e.g. in an e-UTRAN eNB, thus put different requirements on a radio unit and result in different output power ranges. The higher the order of modulation, the smaller the power range. In embodiments of the present invention, the drawback of the limited possibility to reduce the reference signal output power when higher order modulations are used is addressed by a solution where the use of the highest order modulation scheme(s) is restricted. Restricting higher order modulations will lower the requirements on the eNB and make it possible to operate the eNB over a larger power range. This will in turn make it possible to reduce the output power of the reference signal to a lower level, in order to force as many as possible of the active UEs in the cell to do handovers, e.g. when the cell needs to be turned off due to maintenance. By doing so, the congestion of random access channels at the alternative eNB is avoided, which will reduce the disconnection time for UEs that are active in the cell at the time the power is turned off. The overall perception of the system quality for users affected by a maintenance activity may thus be better, also because the maintenance typically results in fewer disconnections.

During normal operation, the operator can set the power levels of reference signals to a certain range—typically a small part of the total output power range—for the purpose of cell planning for example. Equivalently, the maximum total output power level, taking all aspects of scheduling, power settings and power control into account, may also be set by the operator. Furthermore, several different modulation schemes may be used in the RBSs.

Figure 2:
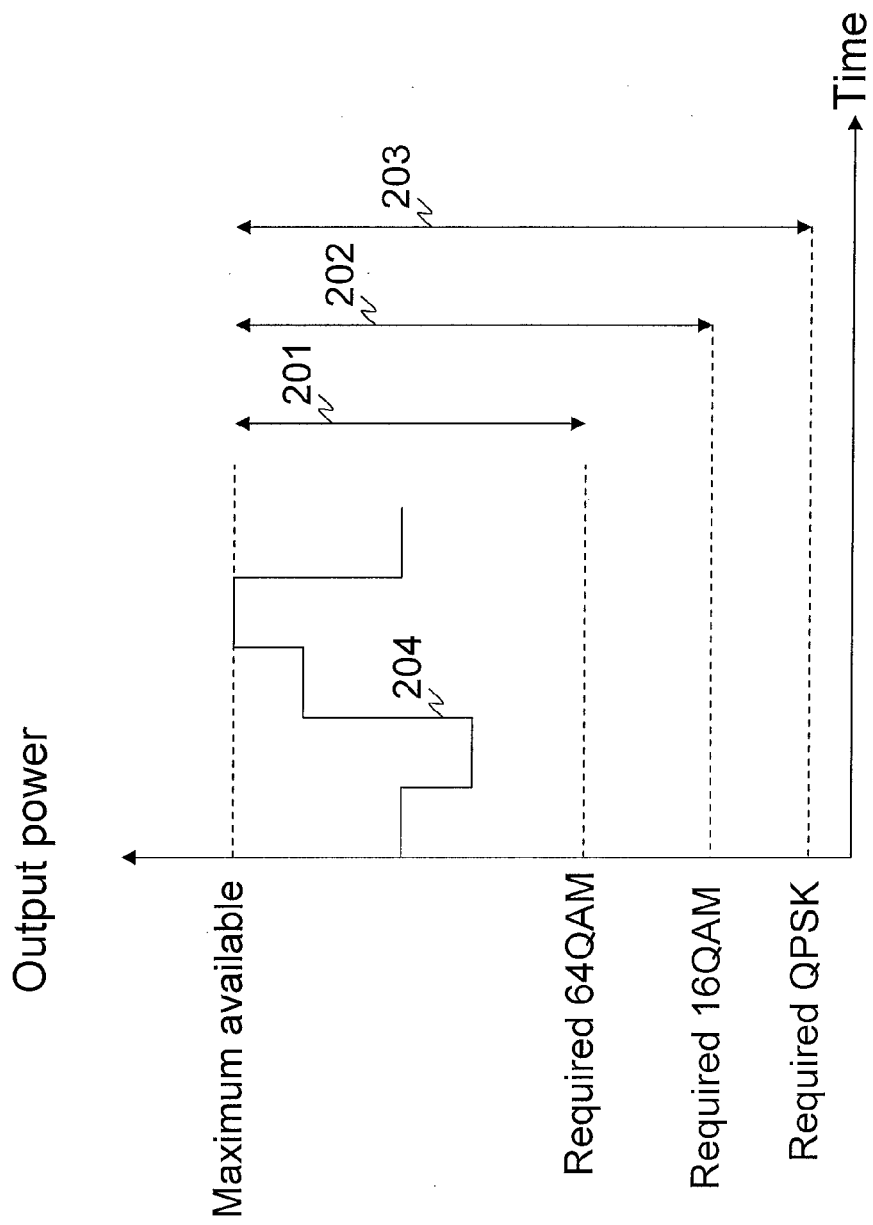
FIG. 2 illustrates schematically the power ranges of eNBs using different types of modulation schemes and how the actual output power may vary with the amount of scheduled resources.

In the following example from an e-UTRAN, the eNB may use three different modulation schemes: QPSK, 16QAM and 64QAM during normal operation. The total output power range may e.g. correspond to 10-40 W, in accordance with the example of Table 1. As already explained above, the scheduling of resources may be done in a part of the total system bandwidth in an e-UTRAN. The actual output power may thus vary from sub frame to sub frame, although the output power spectrum density is the same. The less scheduled resources there are in a sub frame, the lower the actual output power is. FIG. 2 illustrates schematically the total output power ranges of an eNB 201, 202, 203, i.e. the range between the maximum available output power level and the required output power level, when using respectively 64QAM, 16QAM and QPSK as the highest order modulation scheme. It is clearly seen that the required output power level is higher for the eNB using the 64QAM modulation scheme, which will limit the total output power range. It also illustrates how the actual output power 204 may vary from sub frame to sub frame due to the changes in the amount of scheduled resources in a sub frame. The spectrum density together with the scheduling gives the output power level. In the following, the output power spectrum density will be used, as that is the measure that is unaffected by the scheduling.

In embodiments of the present invention, the output power spectrum density of an eNB is gradually reduced in order to prepare for maintenance of an eNB. This means that the reference signal output power will be gradually reduced in a corresponding way, which results in that some UEs are triggered to handover to alternative eNBs before the output power is turned off.

Figure 3:
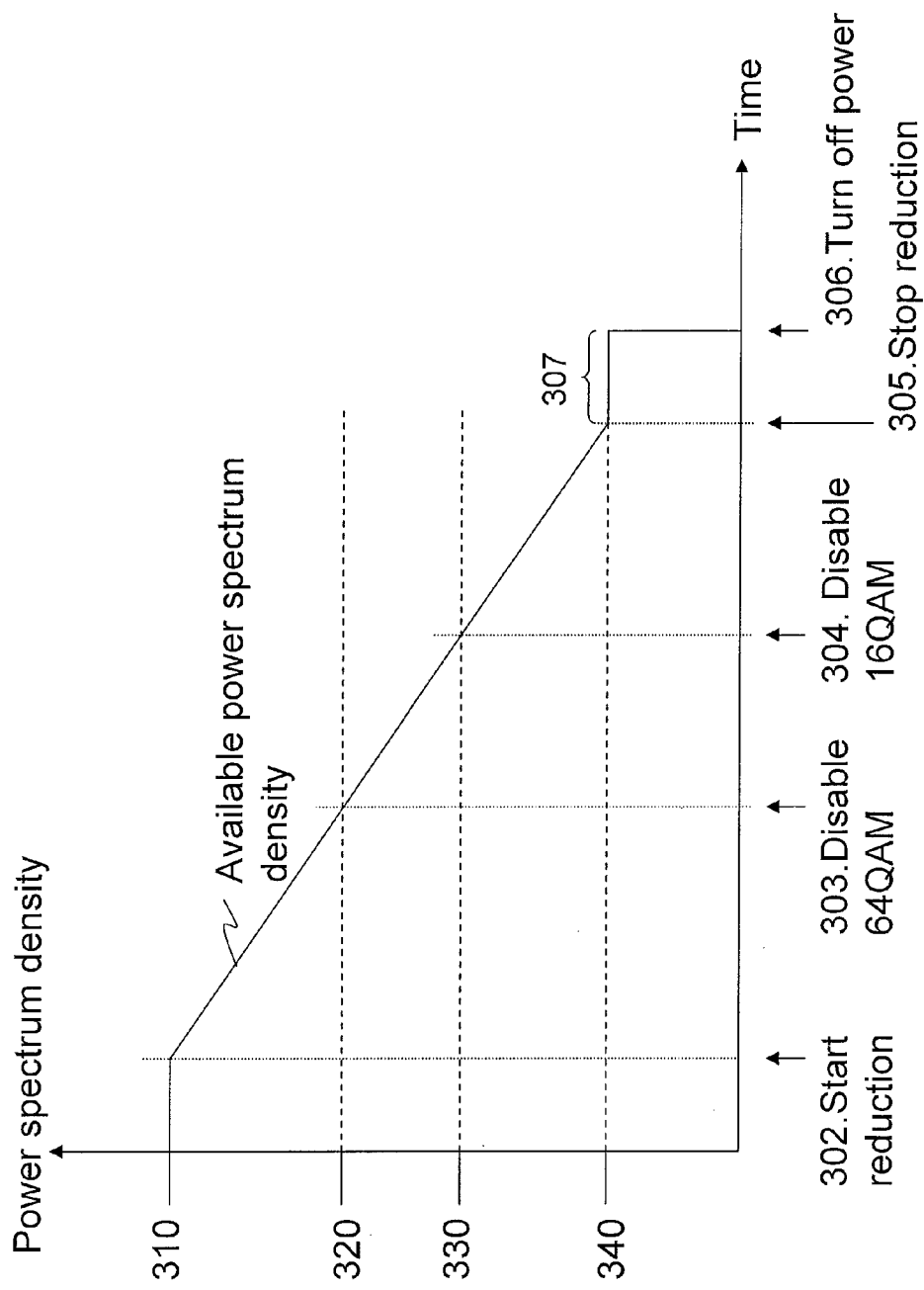
FIG. 3 illustrates schematically one embodiment of the present invention.

FIG. 3 schematically illustrates the basic idea according to one embodiment of the present invention. During normal operation, the maximum available output power spectrum density 310 is constant for a certain eNB. In order to prepare for a coming maintenance activity of an eNB which will require the output power to be turned off for the frequency carrier of at least one cell of the eNB, a reduction of the available output power spectrum density is started 302. As the eNB in this example is using 64QAM for the modulation, the required output power spectrum density is quite high in order for the eNB to fulfill the EVM requirements (see discussion above). The reduction of the output power spectrum density may thus not be continued below this required output power spectrum density. At some point in time before the available output power spectrum density is reduced below the output power spectrum density required for 64QAM 320, the 64QAM is disabled in the eNB 303. This is done by the link adaptation algorithm in the eNB, and the eNB will use a 16QAM modulation scheme instead. The available output power spectrum density may thus be further reduced, as the required output power spectrum density for 16QAM 330 is lower. A corresponding procedure is then repeated, and also the 16QAM modulation scheme is disabled 304. The gradual reduction of the available output power spectrum density may be continued and even more active UEs in the cell are triggered to handover to alternative eNBs. Before the available output power spectrum density falls below the required output power spectrum density of the last remaining modulation scheme 340, which in this case is the QPSK, the reduction is stopped 305, and the output power is turned off 306 after a pre-defined time delay 307. The purpose of the optional pre-defined time delay 307 is to allow UEs that are about to do a handover to complete the handover procedure.

According to embodiments of the present invention, if more than two modulation schemes are available in the eNB, the disabling of higher modulation schemes can be done step by step as late as possible as illustrated in FIG. 3, but it may also be done all in one step. The advantage of doing it step by step as late as possible is that higher order modulation schemes are disabled as late as possible, while doing it all in one step has the advantage of reducing the complexity. Other possibilities in between these two extremes are also possible as described in the following alternative embodiments, where it is assumed that—during normal operation—QPSK, 16QAM and 64QAM are used, and the maximum available output power spectrum density is set to a level that corresponds to 40 W total output power with a maximum of scheduled resources (in accordance with Table 1):

Alternative A: Disabling all the highest modulation schemes in one step as late as possible.
  1. The procedure to gradually reduce the available output power spectrum density is started.
  2. The available output power spectrum density is gradually reduced to the output power spectrum density required for 64QAM.
  3. The maximum used modulation is set to QPSK, i.e. 64QAM and 16QAM are disabled.
  4. The available output power spectrum density is further reduced to the output power spectrum density required for QPSK.
  5. Wait a pre-configured time delay so that UEs that are about to do a handover may complete the handover procedure.
  6. Turn off the output power.

Alternative B: Disabling all the highest modulation schemes in one step, as soon as possible.
  1. The procedure to gradually reduce the available output power spectrum density is started.
  2. The maximum used modulation is set to QPSK.
  3. The available output power spectrum density is gradually reduced to the output power spectrum density required for QPSK.
  4. Wait a pre-configured time delay so that UEs that are about to do a handover may complete the handover procedure.
  5. Turn off the output power.

Alternative C: Disabling all the highest modulation schemes step by step, as late as possible.
  1. The procedure to gradually reduce the available output power spectrum density is started.
  2. The available output power spectrum density is gradually reduced to the output power spectrum density required for 64QAM.
  3. The maximum used modulation is set to 16QAM, i.e. 64QAM is disabled.
  4. The available output power spectrum density is further reduced to the output power spectrum density required for 16QAM.
  5. The maximum used modulation is set to QPSK, i.e. 16QAM is disabled.
  6. The available output power spectrum density is further reduced to the output power spectrum density required for QPSK.
  7. Wait a pre-configured time delay so that UEs that are about to do a handover may complete the handover procedure.
  8. Turn off the output power.

Alternative D: Disabling only the highest modulation scheme (64QAM) as late as possible.
  1. The procedure to gradually reduce the available output power spectrum density is started.
  2. The available output power spectrum density is gradually reduced to the output power spectrum density required for 64QAM.
  3. The maximum used modulation is set to 16QAM, i.e. 64QAM is disabled.
  4. The available output power spectrum density is further reduced to the output power spectrum density required for 16QAM.
  5. Wait a pre-configured time delay so that UEs that are about to do a handover may complete the handover procedure.
  6. Turn off the output power.

Figure 4A:
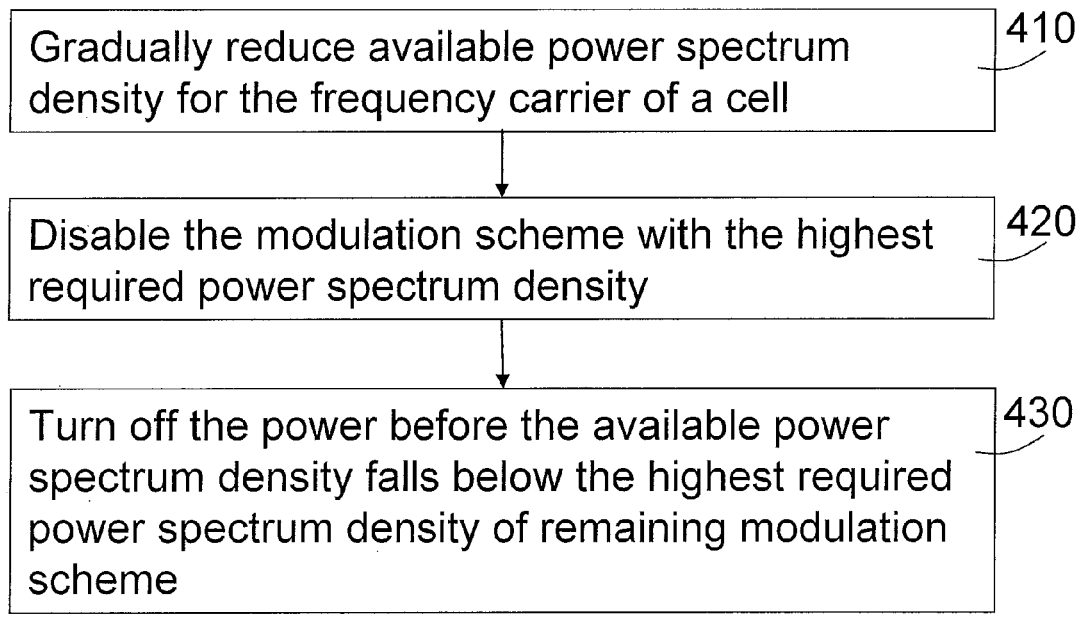
FIGS. 4a-b are flowcharts of the method in the radio base station according to embodiments of the present invention.

FIG. 4a is a flowchart of the method in the RBS according to one embodiment of the present invention. The RBS may in one embodiment be an eNB in an e-UTRAN of an LTE system. It may also be the base station in an GSM EDGE system. The method illustrated in the flowchart comprises the following:
  410: Gradually reduce the available output power spectrum density for the frequency carrier. The gradual reduction may be done in a digital way, thus reducing the output power spectrum density in steps. It may also be possible to do it in an analog way. The reduction is done in order to trigger connected UEs to handover to alternative eNBs or cells before turning off the power.
  420: Disable the modulation scheme with the highest required output power spectrum density. In the case of an eNB using QPSK, 16QAM, and 64QAM, 64QAM has the highest required output power spectrum density (see Table 1) and is thus disabled. This is done sometime before the available output power spectrum density falls below the highest required output power spectrum density of the modulation scheme that is to be disabled, i.e. 64QAM. In one embodiment the method comprises a comparison of the available output power spectrum density with the highest required output power spectrum density. This comparison may be performed continuously in the case of an analogue implementation, or at defined time intervals in a digital implementation. The comparison supports the decision on when to disable a modulation scheme for example, but also when to stop the reduction and/or when to turn off the power (see below). The disabling may be done early, just after starting the reduction as in Alternative B described above, or it may be done as late as possible as described in Alternative D.
  430: Turn off the output power for the frequency carrier, before the available output power spectrum density falls below the highest required output power spectrum density of at least one remaining non-disabled modulation scheme. As described in Alternative D, and according to one embodiment, the output power of the frequency carrier of the cell is turned off already at this stage, although there is more than one remaining non-disabled modulation scheme. It would thus have been possible to disable another of the remaining modulation schemes in order to further continue the reduction. This embodiment is less complex than Alternative C.

Figure 4B:
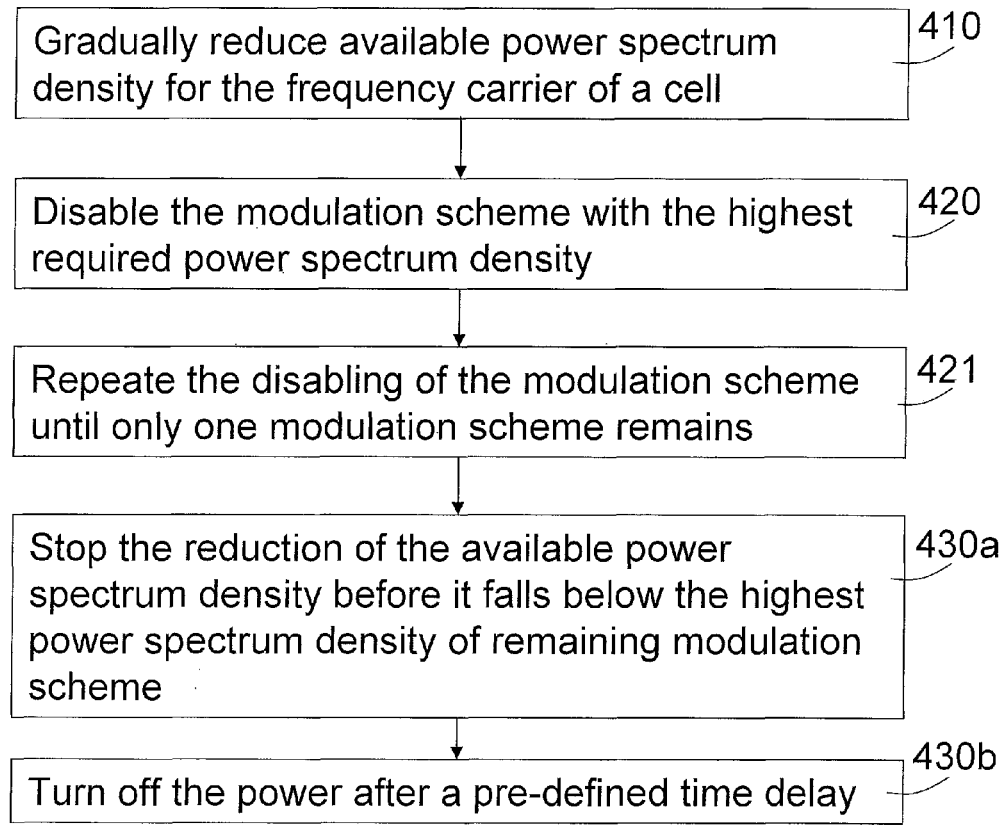

FIG. 4b is a flowchart of the method in the RBS according to another embodiment of the present invention. In this embodiment, the method comprises the following:
  410: Gradually reduce the available output power spectrum density for the frequency carrier.
  420: Disable the modulation scheme with the highest required output power spectrum density. In the case of an eNB using QPSK, 16QAM, and 64QAM, 64QAM has the highest required output power spectrum density (see Table 1) and is thus disabled. This is done sometime before the available output power spectrum density falls below the highest required output power spectrum density of the modulation scheme that is to be disabled, i.e. 64QAM.

421: Repeat the step of disabling the modulation scheme with the highest required output power spectrum density, until only one non-disabled modulation scheme remains. In the exemplary embodiment described in step 420 above, and in a first repetition loop, it is now the 16QAM modulation scheme that has the highest required output power spectrum density and is thus disabled. This is done sometime before the available output power spectrum density falls below the highest required output power spectrum density of the modulation scheme that is to be disabled, i.e. 16QAM. As there is only one remaining non-disabled modulation scheme after this repetition loop in this exemplary embodiment, the repetition is stopped here. According to Alternative A described above, the two modulation of highest order, i.e. 64QAM and 16QAM, may both be disabled already before the available output power spectrum density falls below the 64QAM required output power spectrum density.

430a: Stop the reduction of the available output power spectrum density before it falls below the required output power spectrum density of the remaining non-disabled modulation scheme.

430b: Turn off the output power for the frequency carrier after a pre-defined time delay.

In this embodiment, the reduction is stopped 430a and the power is turned off 430b after a pre-defined time delay, as described in Alternative A-D above, instead of turning off the output power abruptly sometime before the available output power spectrum density falls below the highest required output power spectrum density of at least one remaining non-disabled modulation scheme as described in step 430 above. The advantage of waiting a pre-configured time delay before turning off the output power, is that UEs that are about to do a handover may have time to complete the handover procedure before the power is turned off.

It should be noted that the invention and its embodiments are not limited to an eNB configured to use QPSK, 16QAM and 64QAM. They may also be applied to other types of radio access networks such as GSM/EDGE, and to RBSs configured to use other types and combinations of modulation schemes.

Figure 5:
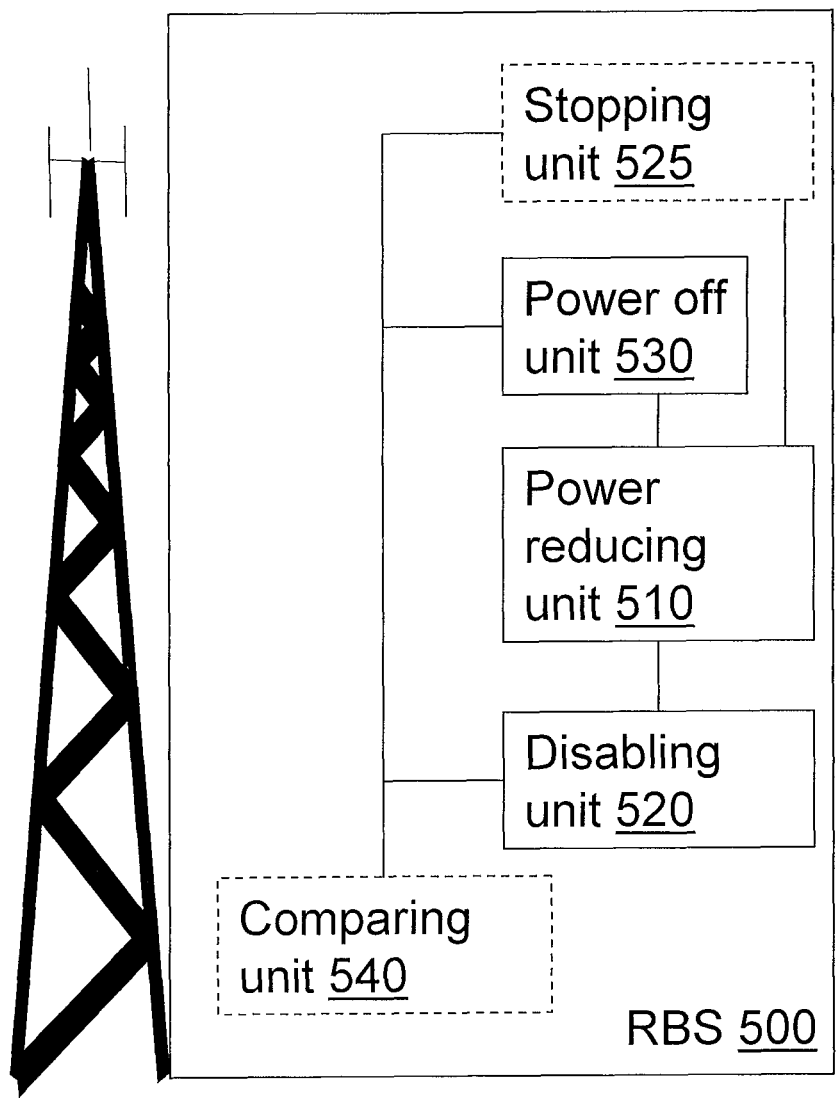
FIG. 5 illustrates schematically the radio base station according to embodiments of the present invention.

The RBS 500 is schematically illustrated in FIG. 5, according to embodiments of the present invention. It is configured to be able to turn off the output power for a frequency carrier of a cell in a wireless communications system, and to use at least two different modulation schemes during ordinary operation. Each of the modulation schemes requires a different output power spectrum density for the frequency carrier. Below that required output power spectrum density, the RBS does not fulfill the EVM and/or emission requirements. The RBS 500 may in one embodiment be the eNB in an LTE system. Alternatively it may be a base station in a GSM/EDGE system. The RBS 500 comprises a power reducing unit 510 which is configured to reduce the available output power spectrum density for the frequency carrier gradually. It also comprises a disabling unit 520 configured to disable the modulation scheme with the highest required output power spectrum density. The disabling should be performed before the available output power spectrum density falls below the highest required output power spectrum density of this modulation scheme. The disabling unit may in one embodiment of the present invention, be further configured to repeat the disabling of the modulation scheme with the highest required output power spectrum density, until only one non-disabled modulation scheme remains. The RBS 500 also comprises a power off unit 530, which is configured to turn off the output power for the frequency carrier before the available output power spectrum density falls below the highest required output power spectrum density of the at least one remaining non-disabled modulation scheme.

According to one embodiment, the RBS 500 also comprises a stopping unit 525 configured to stop the reduction of the available output power spectrum density before it falls below the highest required output power spectrum density of the at least one remaining non-disabled modulation scheme. In this embodiment, the power off unit 530 is configured to turn off the output power for the frequency carrier after a pre-defined time delay. This is to allow UEs that have started a handover procedure to complete the procedure before turning off the power. The RBS 500 may in one embodiment also comprise a comparing unit, configured to compare the available output power spectrum density with the highest required output power spectrum density, in order to support the decisions about when to disable a modulation scheme and when to stop the power reduction and/or turn off the power.

The above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

2G Second generation
3G Third generation
3GPP 3rd Generation Partnership Project
ASIC Application Specific Integrated Circuit
ASK Amplitude Shift Keying
EDGE Enhanced Data Rates for GSM Evolution
eNodeB evolved Node B
e-UTRAN evolved UTRAN
EVM Error Vector Magnitude
GPRS General Packet Radio Service
GSM Global System for Mobile communications
LTE Long-Term Evolution
PSK Phase Shift Keying
QAM Quadrature amplitude modulation
QPSK Quadrature phase-shift keying
RBS Radio Base Station
UE User Equipment
UMTS Universal Mobile Telecommunications System
UTRAN Universal Terrestrial Radio Access Network

The invention claimed is:

1. A method for a radio base station in a wireless communications system, of turning off the output power for a frequency carrier of a cell, wherein the radio base station is configured to use at least two different modulation schemes, and wherein each of the modulation schemes has a different minimum required output power spectrum density for the frequency carrier, the method comprising:
   reducing the available output power spectrum density for the frequency carrier gradually;
   disabling the modulation scheme having a highest minimum required output power spectrum density, before the available output power spectrum density falls below said highest minimum required output power spectrum density; and
   turning off the output power for the frequency carrier before the available output power spectrum density falls below a minimum required output power spectrum density of a remaining non-disabled modulation scheme.

2. The method according to claim 1, wherein turning off the output power comprises stopping the reduction of the available output power spectrum density before it falls below the minimum required output power spectrum density of the remaining non-disabled modulation scheme, and turning off the output power for the frequency carrier after a pre-defined time delay.

3. The method according to claim 1, wherein the radio base station is configured to use more than two different modulation schemes during ordinary operation, and wherein the disabling the modulation scheme having a highest minimum required output power spectrum density comprises disabling the modulation schemes in order of decreasing minimum required output power spectrum density until only one non-disabled modulation scheme remains.

4. The method according to claim 1, further comprising comparing the available output power spectrum density with the minimum required output power spectrum density of the at least two different modulation schemes.

5. The method according to claim 1, wherein the wireless communication system is an LTE system.

6. The method according to claim 1, wherein each of the modulation schemes uses phase shift keying modulation and/or amplitude shift keying modulation.

7. A radio base station configured to be able to turn off the output power for a frequency carrier of a cell in a wireless communications system, and to use at least two different modulation schemes, wherein each of the modulation schemes has a different minimum required output power spectrum density for the frequency carrier, the radio base station comprising:

a power reducing unit configured to reduce the available output power spectrum density for the frequency carrier gradually;

a disabling unit configured to disable the modulation scheme having a highest minimum required output power spectrum density, before the available output power spectrum density falls below said highest minimum required output power spectrum density; and a power off unit configured to turn off the output power for the frequency carrier before the available output power spectrum density falls below a required output power spectrum density of a remaining non-disabled modulation scheme.

8. The radio base station according to claim 7, further comprising a stopping unit configured to stop the reduction of the available output power spectrum density before it falls below the minimum required output power spectrum density of the remaining non-disabled modulation scheme, and wherein the power off unit is configured to turn off the output power for the frequency carrier after a pre-defined time delay.

9. The radio base station according to claim 7, wherein the radio base station is configured to use more than two different modulation schemes, and wherein the disabling unit is further configured to disable the modulation schemes in order of decreasing minimum required output power spectrum density, until only one non-disabled modulation scheme remains.

10. The radio base station according to claim 7, further comprising a comparing unit configured to compare the available output power spectrum density with the minimum required output power spectrum density of the at least two different modulation schemes.

11. The radio base station according to claim 7, wherein the wireless communication system is an LTE system.

12. The radio base station according to claim 7, wherein each of the modulation schemes uses phase shift keying modulation and/or amplitude shift keying modulation.

* * * * *